(12) United States Patent
Kimura et al.

(10) Patent No.: US 7,596,980 B2
(45) Date of Patent: Oct. 6, 2009

(54) METHOD OF FORMING COATED STEEL SHEET

(75) Inventors: Shizuo Kimura, Tochigi (JP); Shiro Kamiyama, Tochigi (JP); Kensaku Fujita, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/815,064

(22) PCT Filed: Dec. 27, 2005

(86) PCT No.: PCT/JP2005/024242
§ 371 (c)(1),
(2), (4) Date: Jul. 30, 2007

(87) PCT Pub. No.: WO2006/082693
PCT Pub. Date: Aug. 10, 2006

(65) Prior Publication Data
US 2008/0148799 A1  Jun. 26, 2008

(30) Foreign Application Priority Data
Feb. 4, 2005  (JP) .......................... 2005-029327

(51) Int. Cl.
*B21D 22/00* (2006.01)
*B21D 22/21* (2006.01)

(52) U.S. Cl. .......................... 72/348; 72/350

(58) Field of Classification Search .......... 72/347–350, 72/338, 341, 379.4, 715; 413/71–73
See application file for complete search history.

(56) References Cited

U.S. PATENT DOCUMENTS

| 3,851,366 | A | * | 12/1974 | Jacobs | ....................... 29/892.3 |
| 4,962,659 | A | * | 10/1990 | Imazu et al. | .................. 72/349 |
| 5,211,047 | A | * | 5/1993 | Kaneyuki | ..................... 72/347 |
| 5,987,951 | A | * | 11/1999 | Saunders | ..................... 72/349 |

FOREIGN PATENT DOCUMENTS

| JP | 02-015834 | 1/1990 |
| JP | 07-314068 | 12/1995 |
| JP | 2004-230440 | 8/2004 |
| JP | 2004-298906 | 10/2004 |

* cited by examiner

*Primary Examiner*—Dana Ross
*Assistant Examiner*—Teresa M Bonk
(74) *Attorney, Agent, or Firm*—Rankin, Hill & Clark LLP

(57) ABSTRACT

A method for forming a container half (10) from a coated steel sheet (21) is provided. Because a first planar part (27) at an outer peripheral part of a first formed body (26) provided through a first drawing step is held by a blank holder (33) during its bending to provide an L-shaped cross-section part (36) in a second drawing step, no wrinkles will develop at a vertical part (38). Because an unnecessary outer part (44) of a flange part (46) is cut off in a trimming step, the width of the flange part is narrowed. By virtue of the narrowed width, no wrinkles will develop during bending of the flange part.

3 Claims, 7 Drawing Sheets (PREF. EMB.)

(COMP. EX.)

(PREF. EMB.)

(COMP. EX.)

METHOD OF FORMING COATED STEEL SHEET

TECHNICAL FIELD

The present invention relates to a method of forming a coated steel sheet into a container half suitable for use as a fuel tank upper half.

BACKGROUND ART

A conventionally typical fuel tank is illustrated in FIG. 9 hereof. The fuel tank 100 is in the form of a container comprised of a lower case 101, a lower inner case 102, and an upper case 103 laid one over the other and connected together by a round-gathering process as at 104.

Reference is made next to FIG. 10 hereof illustrating the round-gathered part or gathering 104 in enlarged cross section. The lower case 101 has an outer peripheral end 105 in the form of a flange simply bent radially outwardly. The lower inner case 102 has an outer peripheral end 106 around which an outer peripheral end 107 of the upper case 103 is twined. Both outer peripheral ends 106, 107 are then twined around the outer peripheral end 105 of the lower case 101. As a result, the outer peripheral end 107 of the upper case 103 becomes longer than the other peripheral ends 105, 106.

Referring next to FIGS. 11A and 11B hereof, discussion will be made as to a mode of forming the gathering 104 through the round-gathering process. Note that the process is performed with the upper case 103 and the lower case 101 turned over.

As shown in FIG. 11A, the outer peripheral end 107 of the upper case 103 is placed on a die 111, followed by placing the outer peripheral end 106 of the lower inner case 102 on the outer peripheral end 107 of the upper case 103. Then, on that outer peripheral end 106 is placed the outer peripheral end 105 of the lower case 101. A punch 112 is then lowered as shown by arrow A. As a result, the outer peripheral end 107 of the upper case 103 is bent as shown by arrow B.

Thereafter, the half-finished product is placed on a separate die 114, as shown in FIG. 11B. This is followed by lowering a separate punch 115 as shown by arrow C. As a result, the outer peripheral ends 105-107 are round-gathered unitarily as shown by arrow D. The half-finished product is then turned over again to its original posture to thereby provide the gathering 104 as shown in FIG. 10.

Continuously, the product is transferred to a coating line, where it is applied with a coat to become a finished product. As can be appreciated, for the product to be finished, it must go through several different processes, namely, round-gathering, transfer to the coating line, and coating. The product transfer to the coating line is particularly tedious and time-consuming, increasing the cost of manufacture of the product.

One known way to reduce the cost of manufacture is to use a pre-coated steel sheet as a starting material and to plastically work such a steel sheet into a container. However, the known way has a drawback in that when the pre-coated steel sheet is largely wrinkled during the plastic working, the coat film thereon cracks up and partially comes off.

As a measure to overcome the problem, JP-2004-298906A proposes a drawing method for plastically working a pre-coated steel sheet in such a manner that the coat thereon does not come off.

The proposed drawing method comprises the steps of drawing a pre-coated steel sheet under various conditions to identify a coat film peel-off state, performing a drawing simulation on an original, non-coated steel sheet under the same conditions, estimating from the results of the preceding two steps a minimum degree of warp that produces partial peeling off of a coat film, and adjusting, during subsequent actual working of a pre-coated steel sheet, a corner cut amount and drawing conditions such that warping at a position where coat film peel-off is most likely to arise is kept smaller than the minimum degree of warp.

For the drawing simulation, a computer simulation called a Computer Aided Engineering (CAE) analysis is employed for estimating warps to be generated on various parts of the non-coated steel sheet.

In the proposed drawing method, however, since the CAE analysis on various parts of the original steel sheet is essential, an extra cost for CAE analysis is required.

Further, because the drawing conditions must be adjusted such that warps are kept smaller than the minimum degree of warp that causes partial peeling off of a coat film. This may not only limit a per-cycle amount of drawing but also may require frequent adjustment operations, thus requiring increased man hours. To sum up, in the proposed drawing method, an increased cost of manufacture is highly likely due to the extra analysis cost combined with the increased man hours.

Consequently, there has been a demand for an improved technique for forming a container half from a coated steel sheet.

DISCLOSURE OF THE INVENTION

According to the present invention, there is provided a method of forming a container half from a coated steel sheet, comprising: a step of providing a planar steel sheet with coatings applied to one or both sides thereof; a first drawing step of drawing a central part of the steel sheet, with an outer peripheral part of the steel sheet held by a first blank holder, to produce a first formed body having a first planar part formed at the outer peripheral part; a second drawing step of drawing the first formed body, with an outer peripheral edge part of the first planar part held by a second blank holder, to make an inner part of the first planar part into an L-shape in cross section to thereby produce a second formed body having a second planar part formed outwardly of the L-shaped part; a trimming step of trimming off an unnecessary outer part of the second planar part to thereby produce a third formed body having a flange part comprised of that part of the second planar part which remained after the trimming-off of the unnecessary outer part; and a bending step of bending the flange part such that the flange part becomes flush with a vertical part of the L-shaped part.

In the inventive method, the vertical part of the L-shaped part is bent in accordance with the second drawing step. Namely, the vertical part of the L-shaped part is bent with the coated steel sheet held by the blank holder. As a result, no wrinkles will develop at the vertical part. In addition, the resulting flange has a small width. This will also assist in preventing development of wrinkles during the flange part bending step. Consequently, complex computer simulations are no longer required. Further, the method does not increase a number of processing steps.

Moreover, because the unnecessary part of the second planar part is cut off in the trimming step, a deformation amount and a residual stress can be kept to a minimum, thus enabling provision of good, distortion-free container halves.

Consequently, in accordance with the inventive method, container halves can be formed from coated steel sheets at a low cost.

BRIEF DESCRIPTION OF THE DRAWINGS

A preferred embodiment of the present invention will be described in detail below, by way of example only, with reference to the accompanying drawings, in which.

BEST MODE FOR CARRYING OUT THE INVENTION

Although discussion will be made below in relation to a fuel tank upper half, the present invention is not limited thereto and may be applied to any types of containers.

Figure 1:
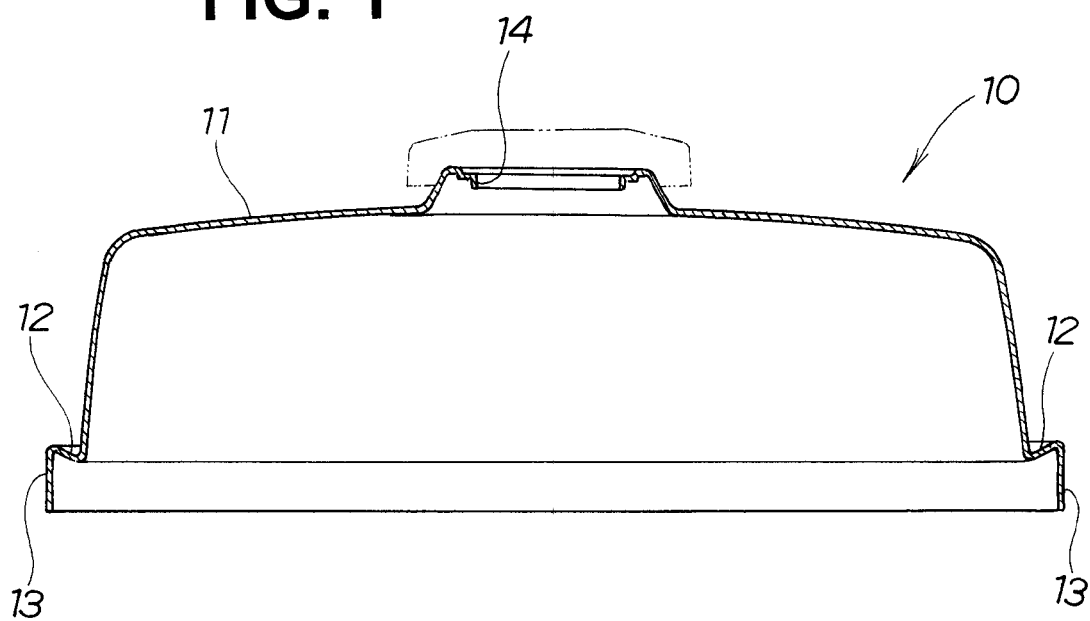
FIG. 1 is a cross sectional view illustrating a container half for use as a fuel tank upper half, produced in accordance with the inventive method.
Figure 2:
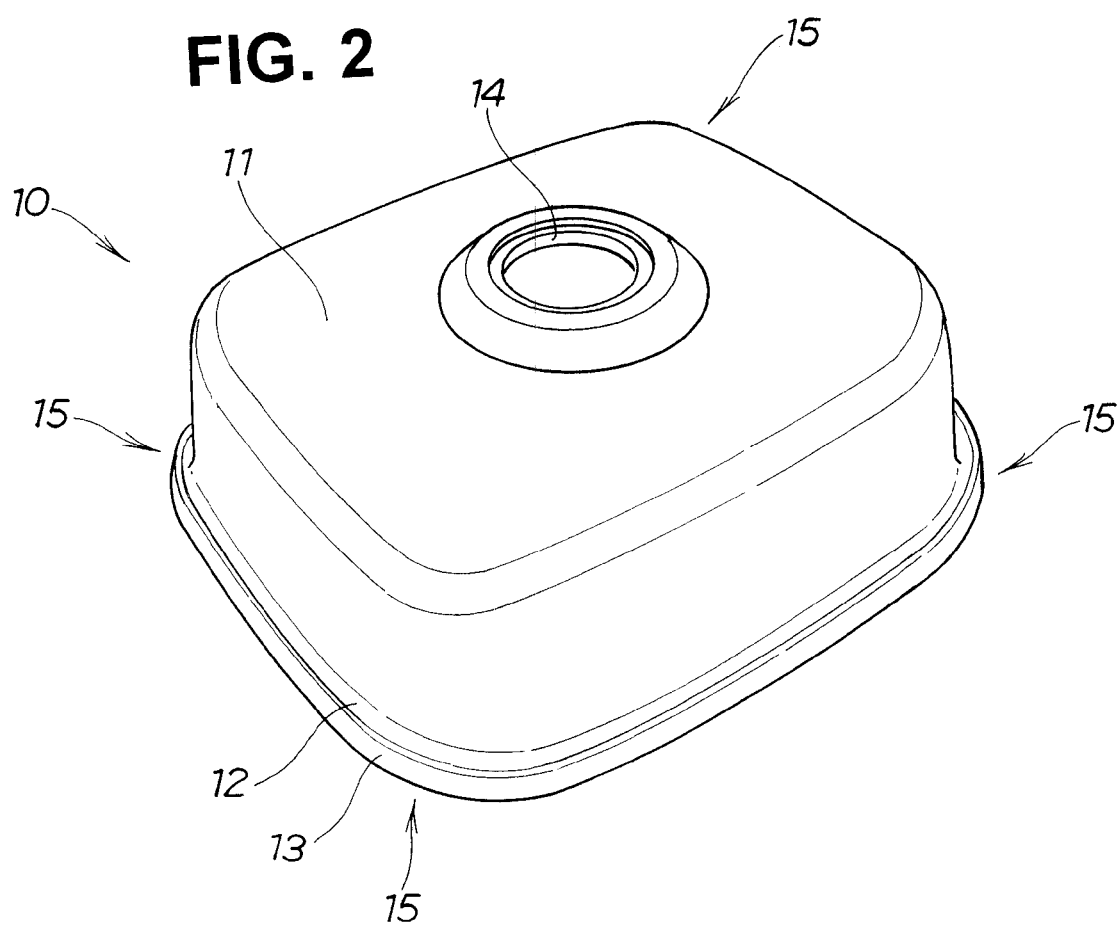
FIG. 2 is a perspective view showing the container half of FIG. 1.
Figure 11A:
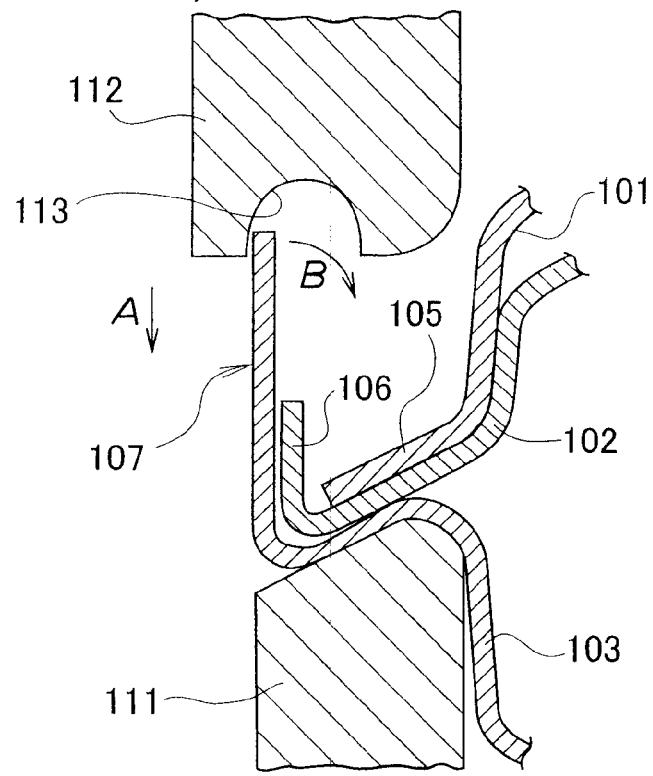
FIGS. 11A and 11B are schematic views showing a conventional round-gathering process.
Figure 11B:
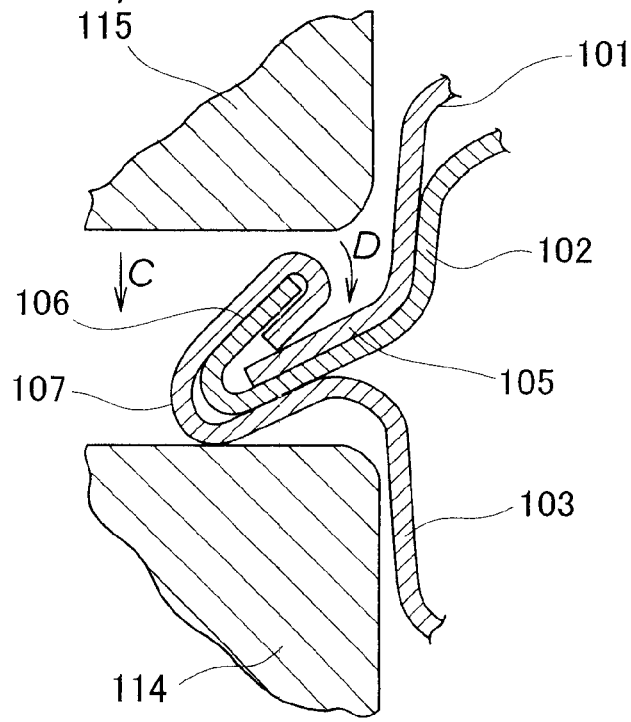

Referring now to FIGS. 1 and 2, a container half 10 comprises a fuel tank upper half, which is finished with its plastic working and readied for subsequent round-gathering process. The container half 10 includes a curved body part 11 having at a lower end thereof a brim part 12 and a drooping part 13 (corresponding to reference numeral 107 of FIG. 11A). Reference numeral 14 designates a filler orifice.

As shown in FIG. 2, the container half or fuel tank upper half 10 is rectangular in shape and has arc parts 15 at four corners thereof.

Discussion will be made next as to a mode of forming the container half 10 from a coated steel sheet with reference to FIG. 3 to FIG. 6.

Figure 3:
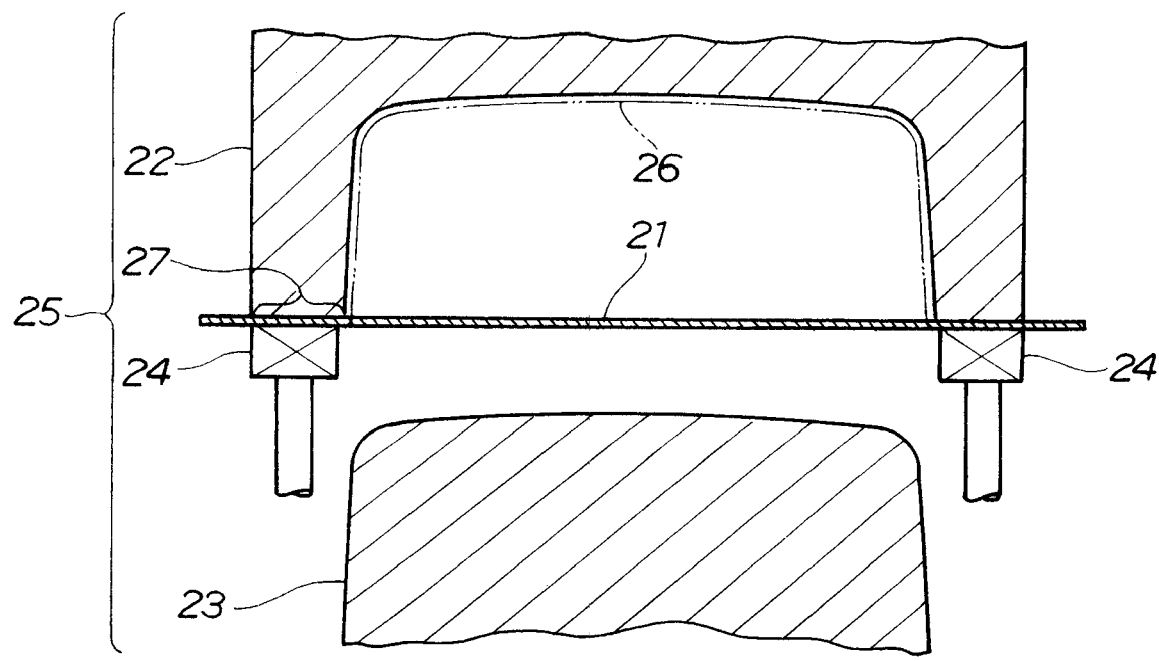
FIG. 3 is a schematic view illustrating a provision step and a first drawing step of the inventive method.

A planar steel sheet 21 coated on one side or both sides, as shown in FIG. 3, is provided first. The coated steel sheet 21 is cut into a predetermined size.

The coated steel sheet 21 comprises a carbon steel sheet having a thickness of 0.4 to 2.0 mm and carrying on one side or both sides a coat film of 10 to 100 μm thickness. Such carbon steel sheets are generally produced on a steel production line of an iron foundry.

To carry out a first drawing step, a first drawing apparatus 25 having a first female die 22, a first male die 23 and a first blank holder 24 is provided.

The coated steel sheet 21 is held firmly between the first blank holder 24 and the first female die 22. Next, the steel sheet 21 is lowered together with the first female die 22 to draw a central part (positioned inwardly of the first blank holder 24) of the steel sheet 21 by the first male die 23. These processes form a first drawing step.

Produced from the first drawing step is a first formed body 26 as shown by a phantom line. The first formed body 26 has a first planar part 27 that remained planar because held by the first blank holder 24. The first formed body 26 has a hat-shaped configuration.

The first formed body 26 having the first planar part 27 is now removed from the first drawing apparatus 25 and transferred to a second drawing step discussed next.

Figure 4:
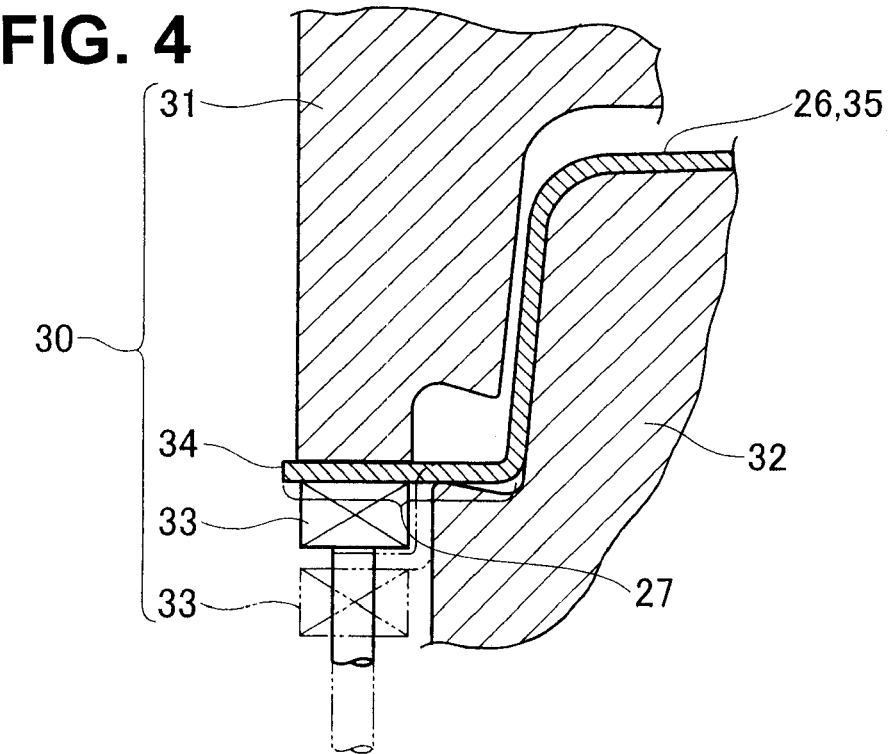
FIG. 4 is a schematic view illustrating a second drawing step of the inventive method.

Reference is now made to FIG. 4 illustrating the second drawing step. A second drawing apparatus 30 having a second female die 31, a second male die 32 and a second blank holder 33 is provided.

The first formed body 26 is placed on the second male die 32 with a peripheral edge 34 of the first planar part 27 held firmly between the second blank holder 33 and the second female die 31.

Next, the second female die 31 is lowered to draw the peripheral edge 34 of the first formed body 26 into a shape as shown by a phantom line.

These processes form the second drawing step, which produces a second formed body 35 including the phantom-lined part. The second formed body 35 is now removed from the second drawing apparatus 30 and transferred to a trimming apparatus discussed next.

Figure 5:
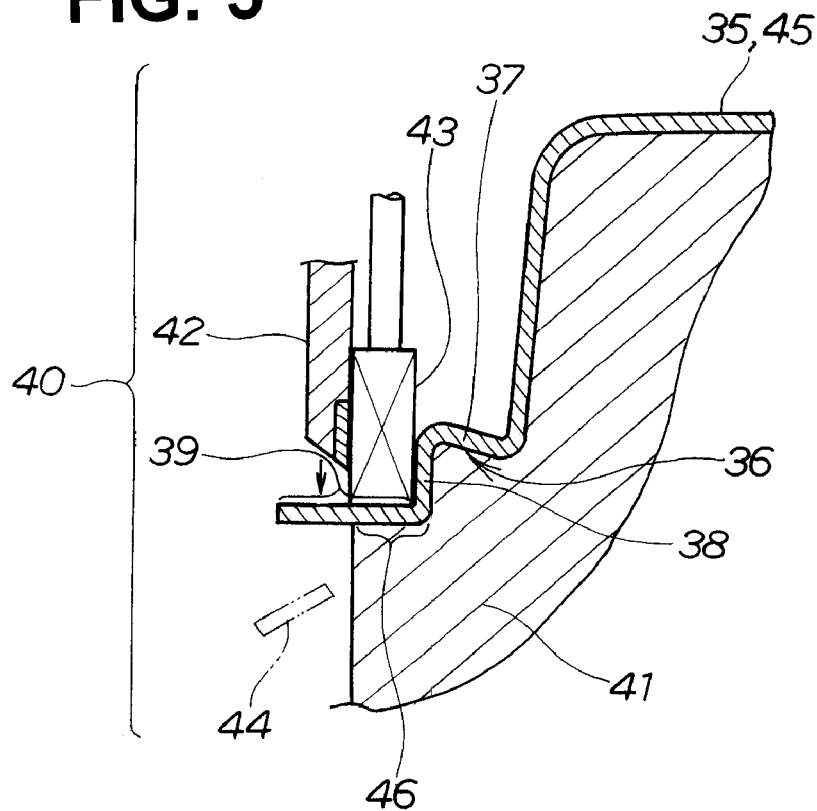
FIG. 5 is a schematic view illustrating a trimming step of the inventive method.

Referring now to FIG. 5, a trimming step will be discussed. The trimming apparatus 40 having a support die 41, a trim blade 42 and a presser member 43 is provided.

The second formed body 35 has an L-shaped part 36 in cross-section, which is comprised of a horizontal part 37 and a vertical part 38. The second formed body 35 also has a second planar part 39 extending outwardly from a lower end of the vertical part 39. The second planar part 39 is provided as a result of having been held by the second blank holder 33 as shown in FIG. 4.

The second planar part 39 of the second formed body 35 is now placed on the support die 41 and pressed firmly by the presser member 43. Then, part 44 of the second planar part 39 unnecessarily projecting outwardly beyond the support die 41 is cut off by the trim blade 42. This completes the trimming step. Produced from the trimming step is a third formed body 45 as shown by a solid line. The second planar part 39, with the unnecessary part 44 cut off, forms a flange part 46.

The third formed body 45 having the flange part 46 is now removed from the trimming apparatus 40 and transferred to a bending apparatus discussed next.

Figure 6:
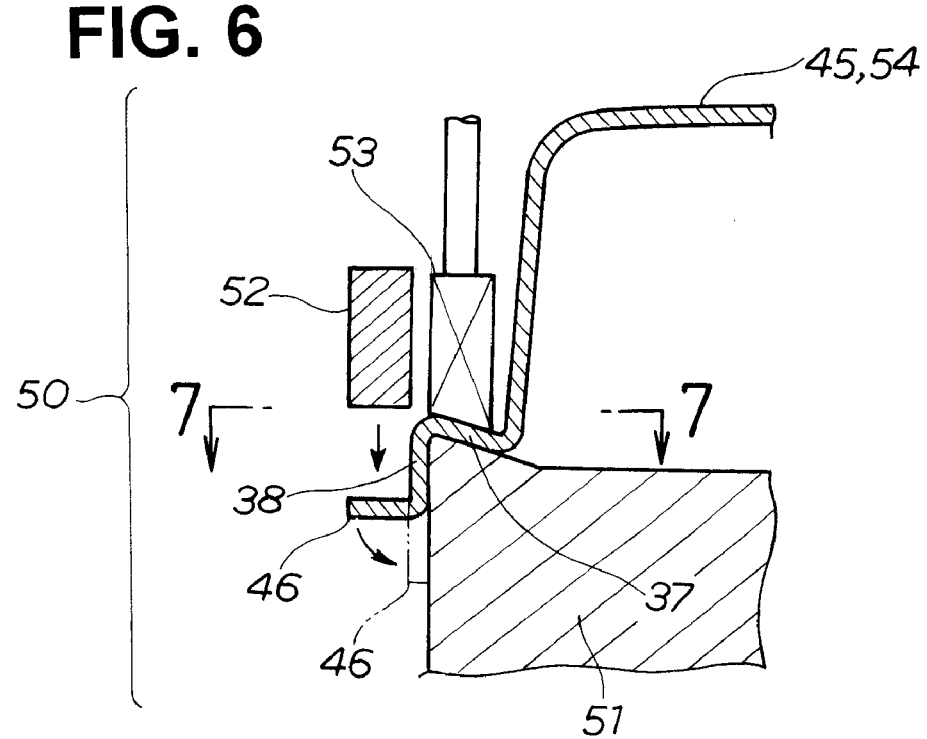
FIG. 6 is a schematic view illustrating a bending step of the inventive method.

For performing a bending step as illustrated in FIG. 6, provided is the bending apparatus 50 having a support die 51, a bender member 52 and a presser member 53.

Next, the solid-lined third formed body 45 is placed on the support die 51 with the horizontal part 37 held firmly by the presser member 53, followed by bending the flange part 46 an angle of approximately 90° by the bender member 52 such that the flange part 46 is placed in the same plane as the vertical part 38, that is, becomes flush with the vertical part 38. This completes the bending step. Produced from this bending step is a fourth formed body 54 with the vertical part 38 and the flange part 46 placed in the same plane. The resulted fourth formed body 54 corresponds to the container half 10 for use as the fuel tank, as shown in FIG. 1.

Figure 7A:
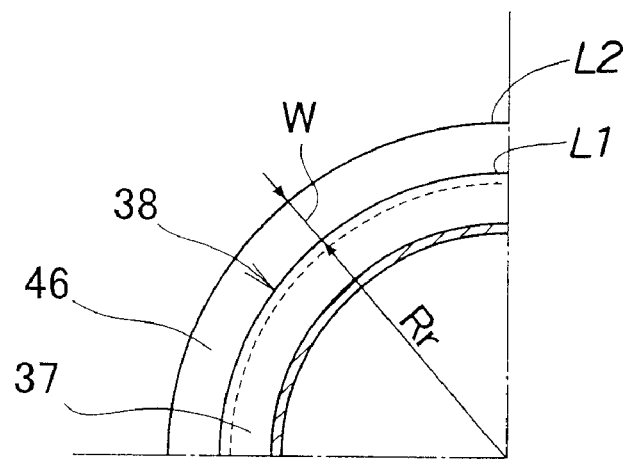
FIGS. 7A to 7D are views showing how four corners of the container half according to an embodiment of the present invention are curved in comparison with a comparative example.
Figure 7C:
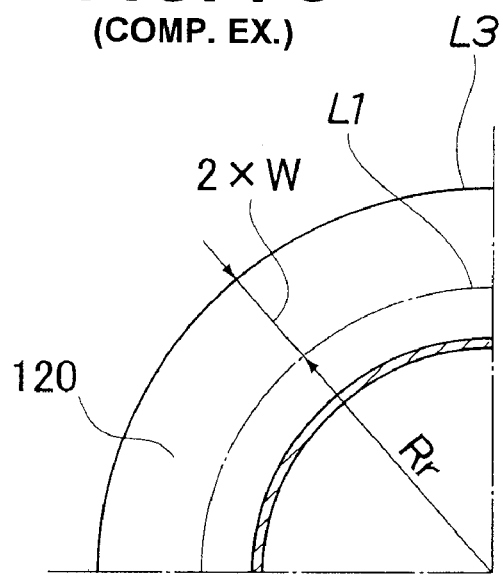
Figure 7B:
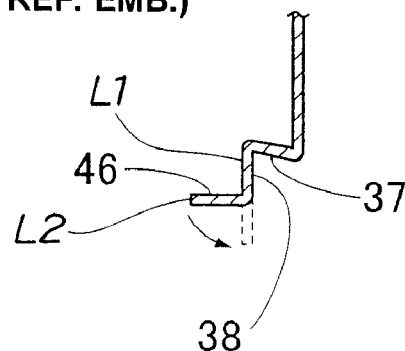
Figure 7D:
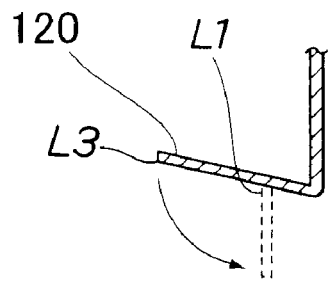

To facilitate understanding of the present invention, discussion will be made next as to a preferred embodiment of the invention and a comparative example, with reference to FIGS. 7A to 7D. FIGS. 7A and 7B show the preferred embodiment while FIGS. 7C and 7D illustrate the comparative example. More specifically FIG. 7A is a cross-sectional view taken along line 7-7 of FIG. 6, showing one of the arced parts 15 of FIG. 2.

As shown in FIG. 7A, the vertical part 38 has a radius of Rr. The flange part 46 of width W extends radially outwardly from the vertical part 38.

A periphery length L1 of the outer peripheral edge of the horizontal part 37 may be obtained from "diameter×π×(¼)". Thus, it becomes π·Rr/2 as a result of the calculation of L1=2×Rr×π×(¼)=π·Rr/2.

Similarly, a periphery length L2 of the outer peripheral edge of the flange part 46 is π·(Rr+W)/2 as a result of the calculation of L2=2×(Rr+W)×π×(¼)=π·(Rr+W)/2.

As the flange 46 is bent in the bending step to make same become flush with the vertical part 38 as shown by a phantom line in FIG. 7B, the periphery length of the outer peripheral edge of the flange part 46 varies from L2 to L1. If π·w/2 obtained through the calculation of L2−L1={π·(Rr+W)/2}−(π·Rr/2)=π·w/2 is absorbed upon compressive deformation of the flange part, no wrinkles will develop. In the preferred embodiment, the flange part 46 has the width W set to absorb π·w/2 so that there will develop no wrinkles that causes undesired coating peel-off.

Discussion will be made next as to a comparative example in which forming is performed through a drawing step, a trimming step and a bending step only, that is, skipping the second drawing step of the present invention.

FIG. 7C illustrates a formed body formed through a drawing step and a trimming step of the comparative example. The formed body has a brim part 120 of a width as large as the sum of the horizontal part 37, the vertical part 38 and the flange part 46 shown in FIG. 7B.

FIG. 7D shows the brim part 120 bent at a periphery length L1 (arc of radius Rr). The bending step provides the same article as the one shown in FIG. 7B. While a periphery length of an outer edge of the brim part 120 before the bending step is L3, it becomes L1 after the bending step.

Turning back to FIG. 7C, of the brim part 120, a part to be bent has a width equal to a sum of the vertical part 38 and the flange part 46 of FIG. 7B. For the sake of convenient discussion, assume that the sum of the vertical part 38 and the flange part 46 is two times the width of the flange part 46, that is, 2×W. The periphery length L3 is provided through the calculation of L3=π·(Rr+2W)/2.

Periphery length difference (L3−L1) is provided through the calculation of L3−L1={π·(Rr+2W)/2}−(π·Rr/2)=π·w. The periphery length difference is two times the preferred embodiment. Half of the difference may be absorbed by internal deformation but another half π·w/2 of the difference may remain unabsorbed, thus causing wrinkles to develop and hence coating peel-off.

That is, if the bending step is carried out on the vertical part 38 and the flange part 46 inclusive without the second drawing step, it becomes necessary to bend a wide part as 120 which is equal to the sum of the vertical part 38 and the flange part 46.

At a point in time just before the bending starts, there is a significant difference between the periphery length L1 of a proximal end part of the vertical part 38 and the periphery length L3 of a distal part of the wide part 120. Because bending makes the long distal end periphery length L3 come closer to the short proximal part periphery length L1, the distal end shrinks partially but the remaining part becomes wrinkled, thereby causing coats to peel-off.

An experiment has been conducted to find out an interrelation between Rr and W, results of which experiment will be described next.

Dies having a corner radius of 30 mm, 45 mm and 60 mm were provided. A coated steel sheet was subjected to the first and second drawing steps and then to the trimming step so that the flange part 43 has a width of 7 mm to 20 mm. Thereafter, a survey was conducted as to whether peel-off of coatings occurred during bending of the steel sheet. The results of the survey are as shown in Table 1 below.

TABLE 1

|  |  | Flange Part Width W(mm) | | | | | |
| --- | --- | --- | --- | --- | --- | --- | --- |
|  |  | 20 | 18 | 15 | 10 | 9 | 7 |
| Corner Radius Rr (mm) | 30 | X | X | X | X | ○ | ○ |
|  | 45 | X | X | X | ○ | ○ | ○ |
|  | 60 | X | ○ | ○ | ○ | ○ | ○ |

* ○ = good; X = No Good

In Table 1, ○ represents a good result while X represents a bad result (development of coating peel-off). These results are also shown in the form of a graph in FIG. 8A.

Figure 8A:
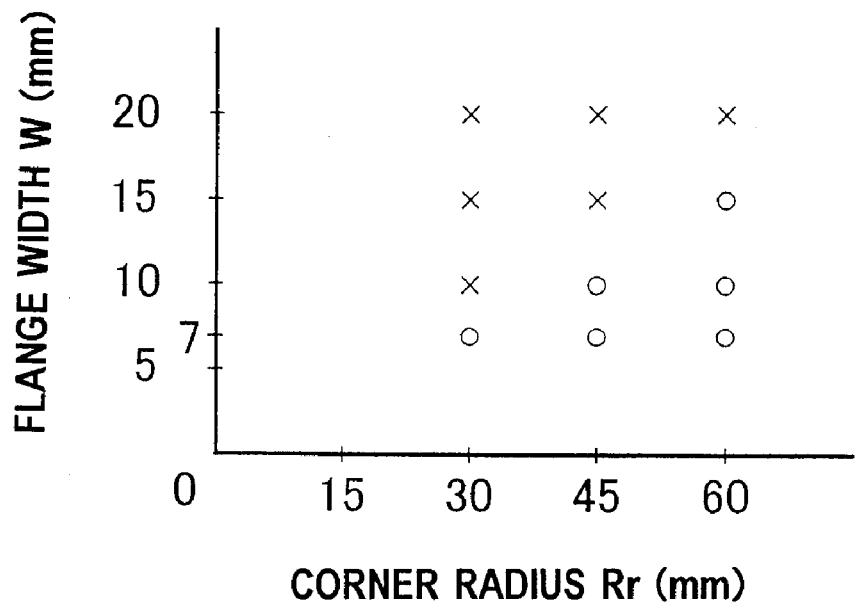
FIGS. 8A and 8B are graphs illustrating a relationship between a radius of a vertical part of a cross-sectionally L-shaped part and a width of a flange part in the corners.

As shown in FIG. 8A, the smaller the width of the flange part becomes, the better the result becomes. The larger the corner radius Rr becomes, the better the result becomes.

Table 1 uses millimeters as the units for both W and Rr. Thus, by dividing the flange part width W by the corner radius Rr, it becomes possible to generalize the present invention.

For example, in Table 1, when the flange width W is 7 mm while the corner radius Rr is 60 mm, the calculation of 7/60=0.11 is performed and the result is listed in the table. The same calculation is done on other W-Rr relations to obtain respective values. These values are listed in the table to provide Table 2 as below.

TABLE 2

|  |  | W | | | | | |
| --- | --- | --- | --- | --- | --- | --- | --- |
|  |  | 20 | 18 | 15 | 10 | 9 | 7 |
| W/Rr | Rr = 30 | X | X | X | X | ○ | ○ |
|  |  | 0.67 | 0.60 | 0.50 | 0.33 | 0.30 | 0.23 |
|  | Rr = 45 | X | X | X | ○ | ○ | ○ |
|  |  | 0.44 | 0.40 | 0.33 | 0.22 | 0.20 | 0.16 |
|  | Rr = 60 | X | ○ | ○ | ○ | ○ | ○ |
|  |  | 0.33 | 0.30 | 0.25 | 0.17 | 0.15 | 0.11 |

Figure 8B:
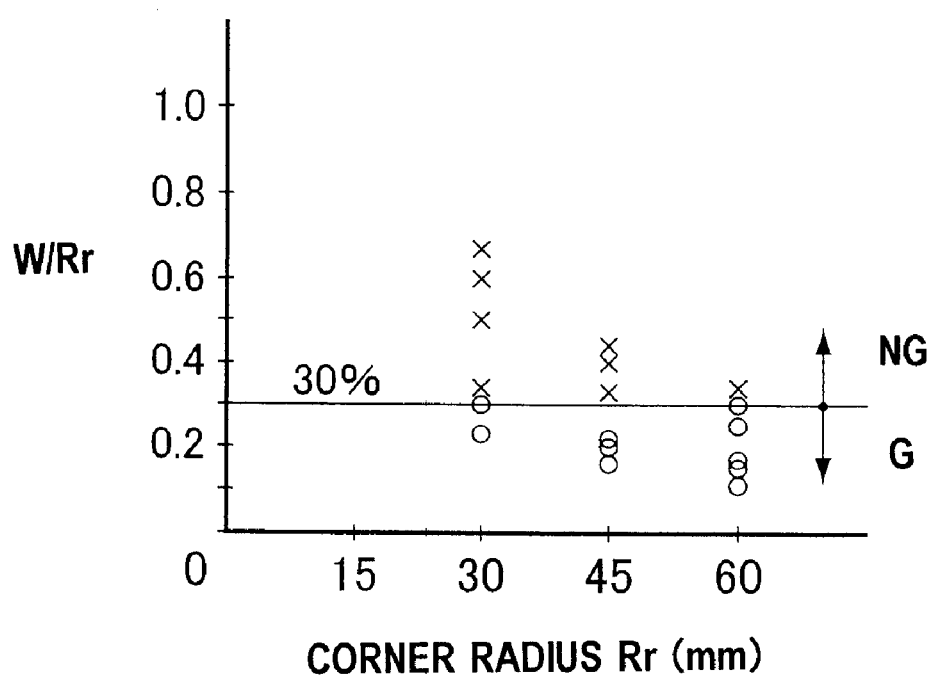
Figure 9:
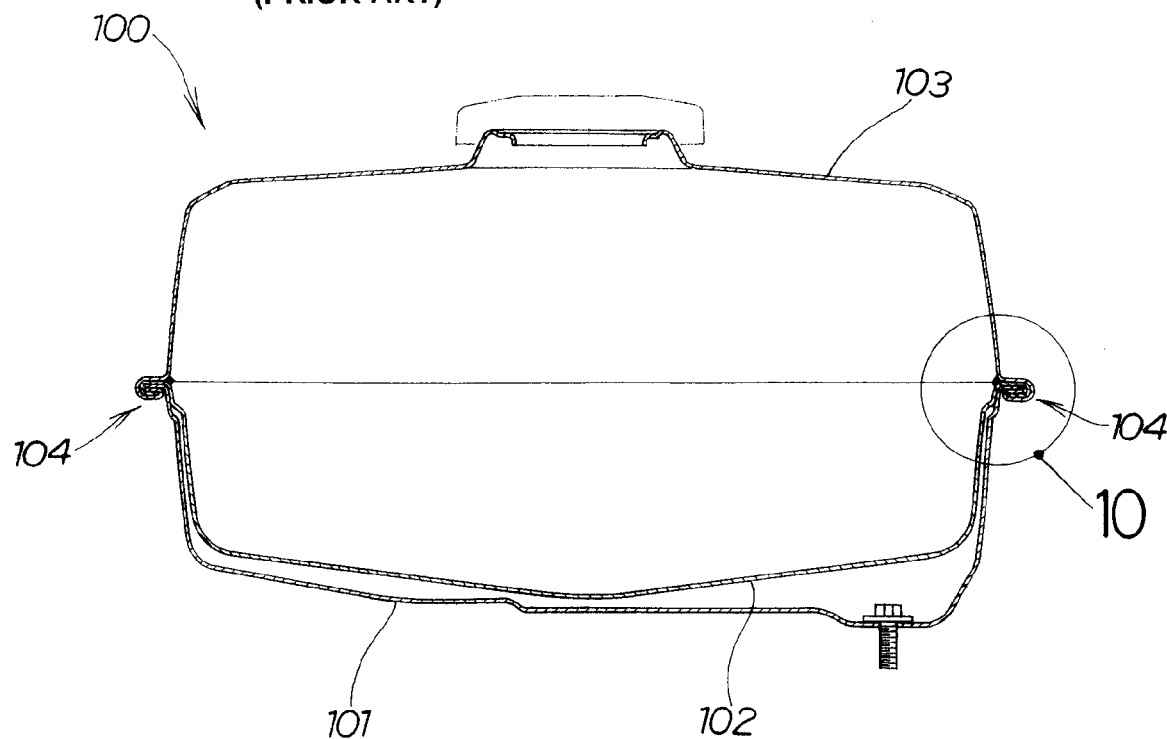
FIG. 9 is a cross sectional view illustrating a conventional fuel tank.
Figure 10:
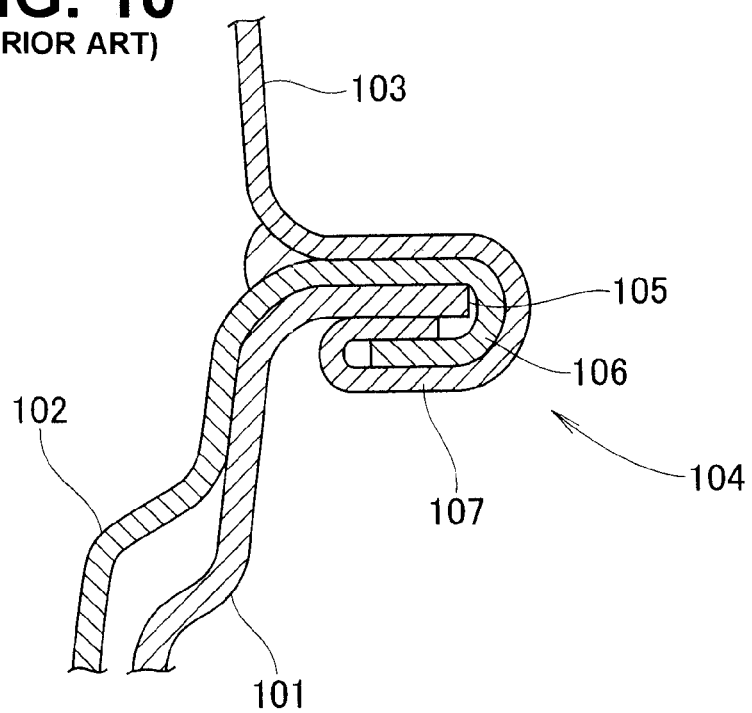
FIG. 10 is an enlarged view of part 10 of FIG. 9.

These results may be advantageously graphed to show their distribution as in FIG. 8B. Rr is shown along a horizontal axis while W/Rr is shown along a vertical axis.

In the distribution graph of FIG. 8B, a classification line may be drawn between Xs that exhibited coating peel-off and ○s that exhibited no coating peel-off. The classification line is at 0.3 of W/Rr, that is, 30%. It may be readily appreciated that when W/Rr is less than 30%, no coating peel-off develops and good formed bodies are produced.

In designing a container half for use as a fuel tank upper half, the flange part width W or the corner radius Rr may be chosen such that W/Rr becomes 30% or less. As a result, the configuration of a desired container half can be decided easily.

Although discussion has been made above in relation to a container half as applied to a fuel tank upper half, the invention may be applied to other container halves than the fuel tank upper half.

As thus far explained, the inventive technique may be utilized in making a container half as a component of a container from a coated steel sheet and is particularly useful in making a fuel tank upper half.

The invention claimed is:

1. A method of forming a container half from a coated steel sheet, comprising:

a step of providing a planar steel sheet with coatings applied to at least one side thereof;

a first drawing step of drawing a central part of the steel sheet, with an outer peripheral part of the steel sheet held by a first blank holder, to produce a first formed body having a first planar part formed at the outer peripheral part;

a second drawing step of drawing the first formed body, said second forming step including holding an outer peripheral edge part of the first planar part with a second blank holder while forming an inner part of the first planar part into an L-shape in cross section including a horizontal part and a vertical part, so as to produce a second formed body with a second planar part disposed outwardly from and extending from a lower end of the vertical part of the L-shaped part;

a trimming step of trimming off an unnecessary outer part of the second planar part to thereby produce a third formed body having a flange part comprised of that part of the second planar part which remained after the trimming-off of the unnecessary outer part; and a bending step of bending the flange part such that the flange part becomes flush with the vertical part of the L-shaped part.

2. The method of forming the container half from the coated steel sheet of claim 1, wherein during said second drawing step, said outer peripheral edge part is held firmly between the second blank holder and a female die.

3. The method of forming the container half from the coated steel sheet of claim 2, wherein said second blank holder and female die are moved relative to a male die to form the inner part of the first planar part into the L-shaped cross section while the outer peripheral edge part held between the second bland holder and female die remains as the second planar part.

* * * * *